H. EDDY.
Crib for Horses.
No. 36,287. Patented Aug. 26, 1862.
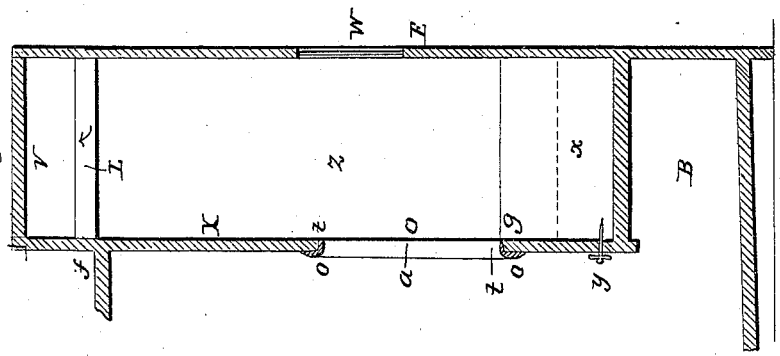
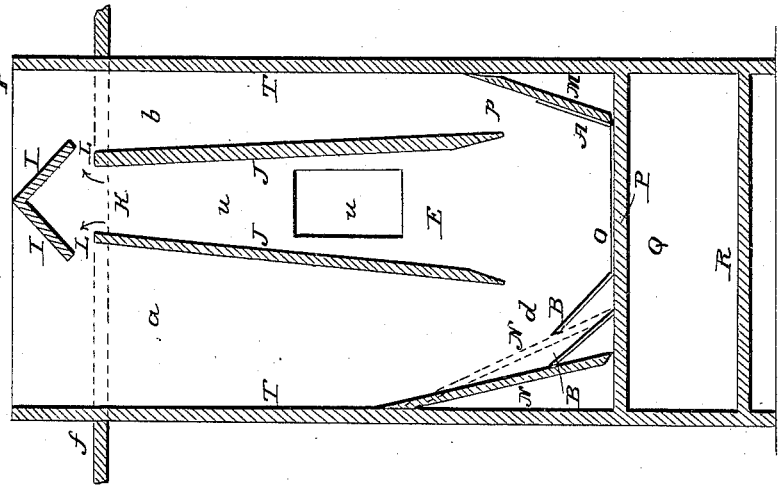
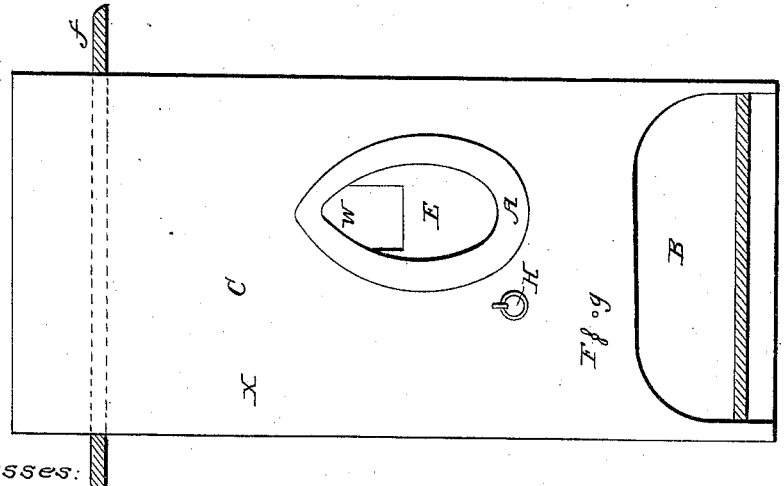
Witnesses:
Henry J. Eddy
Willard Eddy
Inventor:
Henry Eddy

UNITED STATES PATENT OFFICE.

HENRY EDDY, OF NORTH BRIDGEWATER, MASSACHUSETTS.

IMPROVEMENT IN CRIBS FOR HORSES.

Specification forming part of Letters Patent No. 36,287, dated August 26, 1862.

*To all whom it may concern:*

Be it known that I, HENRY EDDY, of North Bridgewater, in the county of Plymouth, in the State of Massachusetts, have invented a new and useful Improvement in the Mode of Constructing Cribs for Horses; and I do hereby declare that the following is a full and exact description thereof, reference being had to the accompanying drawings, and to the letters of reference marked thereon.

Of the said drawings, Figure 1 denotes a front view of the crib; Fig. 2, a vertical and longitudinal section; Fig. 3, a vertical and transverse section.

My design is to construct a crib or manger in such a manner as to combine great simplicity, neatness, economy, and durability, and thus obviate most of the difficulties which have hitherto existed in the feeding of horses.

In carrying out my invention I dispense entirely with the rack and shallow manger which are in common use, and construct the crib C, Fig. 1, in the following manner:

The crib which is represented in the drawings consists in part of a box as its external case, which has four sides, E X T T, united together. The partition or boarding E constitutes the front side of the crib, as seen in Fig. 1. I usually construct the crib in such a manner that the boarding E constitutes a part of the wall or covering to the stable. The window *w* is inserted in the side E, as seen in Fig. 1, to accommodate the horse with light at all times and with fresh air in sultry weather.

The partition or boarding X, as shown in Fig. 1, constitutes the rear side of the crib, which extends from the floor or bottom of the crib P to the upper floor, *f*, and may, if desired, extend higher than the floor *f*, as shown in the drawings. An oblong hole is made in the boarding X, for inserting the head and neck of the horse, which is entirely encircled by a metallic collar.

The metallic collar A, as seen in Fig. 1, is employed to protect the oblong hole which is made in the boarding X from the teeth of the horse. The lip or flange *t*, as seen in Fig. 3, covers the entire edge of said oblong hole. The face *o* of said collar, as seen in Fig. 3, covers the entire margin of the oblong hole. Said metallic collar may be made in separate sections and subserve substantially the same purpose. The lip or flange *t* may be omitted without destroying its utility, especially when it is used, as it may be, for other animals than horses. H, as seen upon the boarding X in Fig. 1, is a ring to which a horse may be tied.

The space B, as seen in Fig. 1, beneath the crib is for the purpose of storing the bedding of the horse.

The bottom or floor of the crib P, as seen in Fig. 2, is covered with a metallic plate, *o*, to keep the same sweet and clean and to protect the same from the teeth of the horse.

T T, as seen in Fig. 2, are ends of the crib or partitions, which may separate the same from adjacent cribs. Said ends or partitions extend from the floor upon which the horse stands, as seen at K in Fig. 2, to the line *n* above the floor *f*. Said partitions may extend no farther upward than the floor *f*, as seen in the drawings.

The inclined planes J J, as seen in Fig. 2, are inserted between the front side, E, and rear side, X, of the crib. Said inclined planes are employed to allow the food of the horse to descend without coming in contact with his head. These inclined planes partially inclose the space *u*, which may be occupied by the head of the horse when he is fed. Open spaces *a b*, as seen in Fig. 2, are formed in part by these inclined planes and the ends of the crib T T, through which the food may descend to the horse. A vertical opening, as seen at K in Fig. 2, is formed between these inclined planes, through which rarefied air, especially the breath of the horse, may escape. A triangular cap composed of the sides I I, as seen in Fig. 2, is applied above the vertical opening K, which entirely spans said opening to prevent the deposit of hay-seed or other matter upon the head of the horse. Open spaces L L are formed beneath said triangular cap for the escape of the breath of the horse.

The inclined planes M N, as seen in Fig. 2, are inserted between the front side, E, and the rear side, X, of the crib, the object of which is to operate as regulators of the feed. Said inclined planes may be permanently attached to the bottom P and to the sides T T of the crib, or may be rendered movable, as seen in Fig. 2. When the inclined plane N is rendered movable, it is held in place by the screw F, as seen in Fig. 1. The space formed between the inclined plane N and the lower extremity of the inclined plane J, as seen at $d$, Fig. 2, is intended to constitute a delivery through which the horse shall receive hay and other strawy matter. By withdrawing the screw F the inclined plane N may be moved forward to occupy the position of the dotted lines N for the purpose of contracting the delivery $d$. When occupying this position, it will be held in place by inserting the screw in the hole $g$, as seen in Fig. 1.

The operation of the movable inclined plane N is to check or stop hay and other strawy matter at the point $d$, where it may be reached by the horse, or to render the opening $d$ variable. The space $p$ between the inclined plane M and the lower extremity of the inclined plane J may be unobstructed for the delivery of grain to the horse; or, if desired, the inclined plane M may be rendered movable in like manner as the inclined plane N, already described. The lower parts of the inclined planes M N are covered by the metallic plates A B, to protect the same from the teeth of the horse. The lower edges of these metallic plates rest against or impinge upon the extremities of the metallic plate $o$. The connection thus formed between these metallic plates and the metallic plate $o$ has all the effect of a joint, and they may be placed at any desired angle with the metallic plate $o$ to accommodate the position of the inclined planes M N. I employ an india-rubber tube or other elastic substance to prevent a horse from cribbing, as represented at $g$ in Fig. 3. Said india-rubber tube, commencing at a point, $s$, in the oblong hole $a$, extends and is made to rest upon the flange $t$ of the metallic collar, as seen in Fig. 3, until it reaches a corresponding point on the opposite side of said oblong hole. The two ends of this elastic tube are made to rest upon the two inclined planes J J. Other elastic material may be used to subserve the same purpose—viz., a cushion composed of some elastic substance or a metallic spring may be used to produce a like result, firmness in the material presented to the teeth of the horse being a necessary condition to prevent his cribbing.

The advantages of my invention may be stated as follows: First, the crib is made of great durability; second, it is abundantly ventilated; third, the horse is in no danger of becoming a cribber; fourth, he does not waste a particle of his food; fifth, the head of the horse cannot be soiled with hay-seed or other matter; sixth, the breath of the horse does not penetrate or ascend through a mass of hay and thus render it unfit for use.

I claim nothing original in the construction of a deep crib or manger with an oblong hole for inserting the head and neck of the horse, and nothing which was secured to me by Letters Patent of the United States, bearing date January 6, 1857.

What I claim, and desire to secure by Letters Patent, is—

1. The metallic collar A, with or without the flange $t$, in combination with the crib, substantially as described, and for the purpose herein set forth.

2. The use of the adjustable regulators of the feed M N, in combination with the sides of the crib E X, substantially as specified.

3. The elastic material $g$, in combination with the crib C, substantially as described, and for the purpose herein set forth.

4. The manner of connecting and adjusting the plates B and $o$, as and for the purpose specified.

5. The variable openings $d$ $p$, substantially as described, and for the purpose herein set forth.

In testimony whereof I have set my hand this 26th day of December, 1861.

HENRY EDDY.

Witnesses:
 HENRY T. EDDY,
 WILLARD EDDY.